L. A. GRIFFIN.
PIPE FITTING FOR MATERIAL CONVEYING LINES OR CONDUITS.
APPLICATION FILED FEB. 5, 1914.

1,138,375.

Patented May 4, 1915.
2 SHEETS—SHEET 1.

Witnesses
Charles A. Aicken
Bessie Diener

Inventor
Lorne A. Griffin

By Louis C. Vanderlip
Attorney

L. A. GRIFFIN.
PIPE FITTING FOR MATERIAL CONVEYING LINES OR CONDUITS.
APPLICATION FILED FEB. 5, 1914.

1,138,375.

Patented May 4, 1915.
2 SHEETS—SHEET 2.

Witnesses
Charles A. Aitken
Bessie Diener

Inventor
Lorne A. Griffin
By Louis C. Vanderlip
Attorney

UNITED STATES PATENT OFFICE.

LORNE A. GRIFFIN, OF ELKHART, INDIANA.

PIPE-FITTING FOR MATERIAL-CONVEYING LINES OR CONDUITS.

1,138,375.

Specification of Letters Patent.   Patented May 4, 1915.

Application filed February 5, 1914.   Serial No. 816,797.

*To all whom it may concern:*

Be it known that I, LORNE A. GRIFFIN, a citizen of the United States, residing at Elkhart, in the county of Elkhart and State of Indiana, have invented a new and useful Improvement in Pipe-Fittings for Material-Conveying Lines or Conduits, of which the following is a specification.

The invention relates to an improvement in T's or pipe connections for use in pipe lines or conduits built for conveying materials of various kinds at great speed by either the blast or vacuum system, or a combination of both systems, and especially to the conveyance of materials of high abrasive qualities on account of which rapid wear of the conduit pipe and fittings results.

The objects of my invention are, first, to provide a T fitting having a removable wear taking liner, or liners; second, to provide a T of the character mentioned in which the wear taking liner replacements may be made without the removal of the T body itself from the pipe or conduit line; third, to provide a conduit T fitting the branch of which is adapted to be used as a feed hopper for a conduit of the character mentioned.

Figure 1:
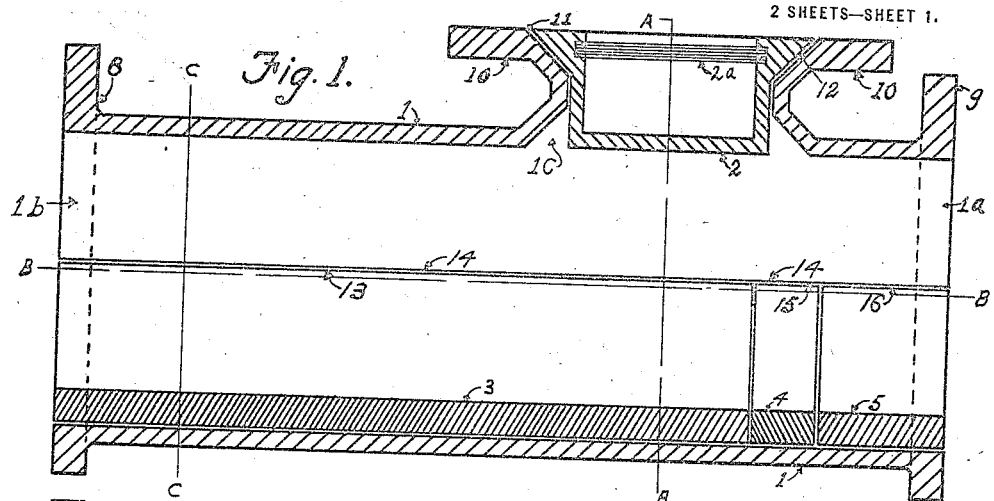
Figure 2:
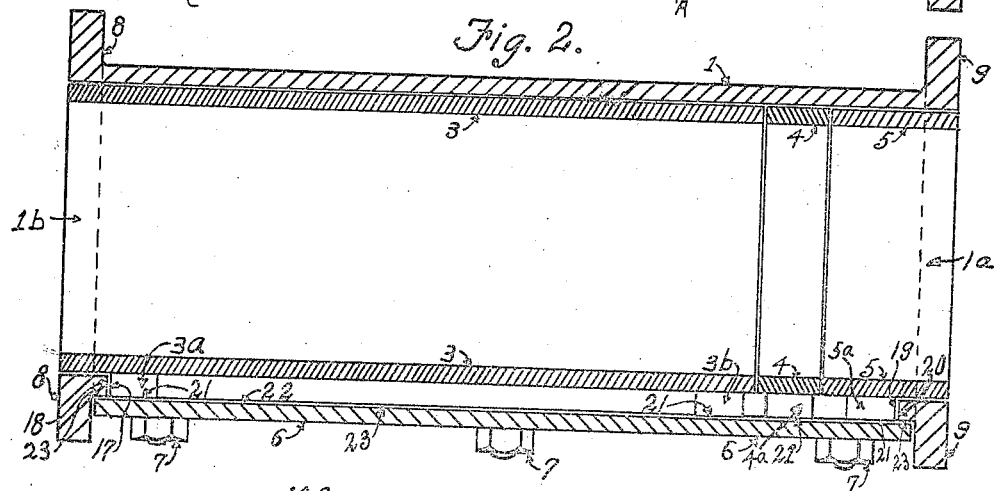
Figure 3:
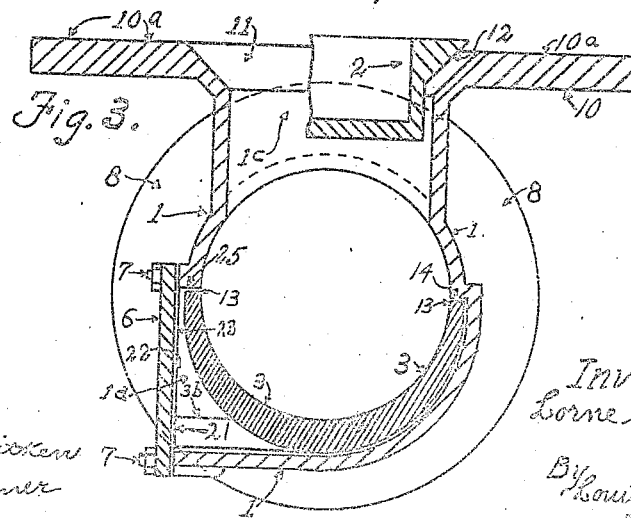
Figure 4:
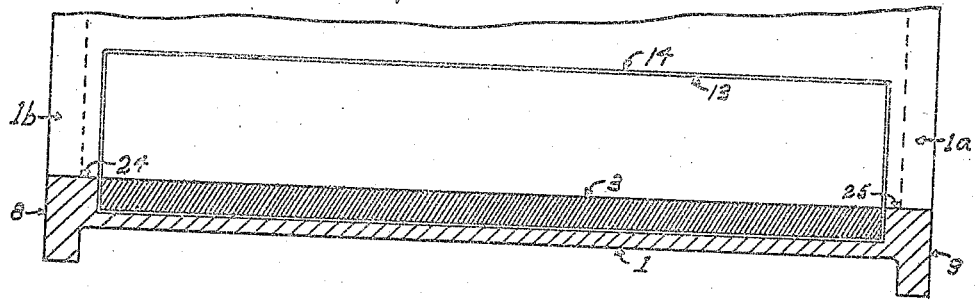
Figure 5:
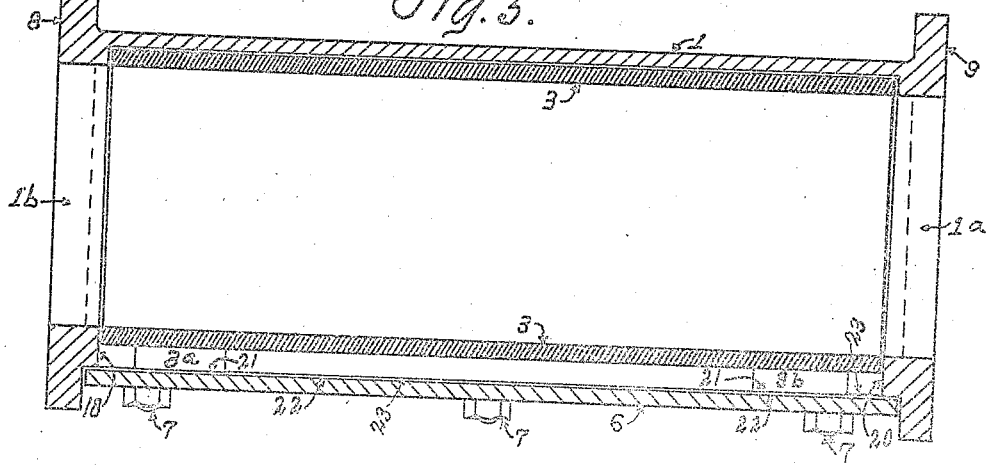
Figure 6:
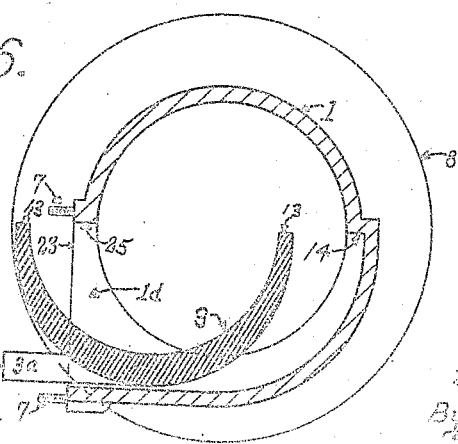

Figure 1 is a side elevation of the T fitting in section with the hopper cover in position, and having its wear taking liner in three sections; Fig. 2 is a section through the T fitting on the line B—B of Fig. 1. Fig. 3 is a section through the T fitting on the line A—A of Fig. 1 showing the hopper cover in fragment, and the side opening cover plate and liner in position. Fig. 4 is a fragmentary section similar to Fig. 1 of the T when the liner is made in one piece. Fig. 5 is a section on the line B—B of Fig. 1 through a T having its liner in one piece only, showing the liner and side cover plate in position. Fig. 6 is a section through the pipe fitting on the line C—C of Fig. 1 showing the liner partially withdrawn from the bore of the T body and the side plate removed.

Similar numerals refer to similar parts throughout the several views.

In the drawings Figs. 1, 2 and 3 show sections of a T having a wear taking liner in three segmented pieces. Figs. 4 and 5 show sections of a T body with a single piece liner of segmental form arranged within said T and occupying less than the length of the bore thereof.

The preferred form of my improved form of pipe connection is shown in Figs. 1 and 2 wherein the wear taking liner is segmental, eccentric and occupies the full length of the bore thereof.

The cover 2 operates as a seal for the hopper opening 1$^c$ of the branch or lateral of said T. And the side plate 6 seals the opening 1$^d$ after the insertion of the wear taking liner, or liners, into the bore of the T. The T 1 has openings 1$^a$ and 1$^b$, and flanges 8 and 9 for pipe line connection in any suitable manner.

The liners 3, 4 and 5 in Figs. 1 and 2 carry lugs 3$^a$ and 3$^b$, 4$^a$ and 5$^a$ respectively. When the one piece liner 3 is used, as in Figs. 4 and 5, lugs 3$^a$ and 3$^b$ are formed thereon at or near the extremities thereof, as shown.

The hopper cover plate 2 has a handle 2$^a$ formed thereon in any suitable manner, and a conical face 12 which seals the opening 1$^c$ when surface 12 contacts with the conical seat 11 of the hopper opening 1$^c$. At this point a tight joint is essential to preserve the vacuum within the pipe conduit when in operation, and the conical seat 11 is formed at such an angle that no materials can collect thereon to make an imperfect and leaky seal or joint between the face 12 of the cover 2 and the conical seat 11.

The hopper flange 10 may be laterally extended as at 10$^a$ for building in flush with the surface of a floor of cement or other material. The branch opening, or hopper, 1$^c$ is placed closer to one end of the T body than to the other in order that the abrasive action of the materials entering the hopper may always be expended upon and taken up by the ways of the fitting. The liners 3, 4 and 5 of Figs. 1 and 2, as well as liner 3 of Figs. 4 and 5, are preferably formed segmental and eccentrically, as shown, for the most of the wear and abrasion occurs at the bottom or thickest part of the liner. Liner 3 has edges 13 and 13 which engage with shoulders 14 and 25 respectively, interiorly formed in said T body. Liners 4 and 5 are concaved to the same circle or radius used for liner 3 and have their edges 15 and 16 for engagement with the shoulders 14 and 25 of the T body. The lower half of the T body 1, both interiorly and exteriorly, is built to accommodate the eccentricity of the segmented liners.

At one side of the body 1 is formed the liner opening 1$^d$ for the insertion and removal of the wear taking liners. This opening is sealed by cover plate 6 as shown at Fig. 3 and Fig. 2 by the use of studs or bolts 7, 7, 7 and 7. When but one liner is used, as in Figs. 4 and 5, it is inserted through opening $1^d$ to the interior of the T body 1, leaving the lugs $3^a$ and $3^b$ projecting backward approximately to the edge of the opening $1^d$. When cover plate 6 is bolted over opening $1^d$ the inside face 22 of said plate presses against the end 21 of lugs $3^a$ and $3^b$, thereby forcing projection 13 and 13 of the liner tightly against shoulders 14 and 25. When a plurality of liners is used, for instance, three as shown in Fig. 2, each liner section is held tightly in position by the plate 6 by virtue of the pressure brought to bear on the face 21 of the lugs $3^a$ and $3^b$ of liner section 3, lug $4^a$ of the liner section 4 and lug $5^a$ of liner section 5. The liners 3, 4 and 5 are arranged within the T body singly and as follows. Cover plate 6 having been removed, liner 3 is inserted through $1^d$ until the edge 13 is in full engagement with the shoulder 14, when the liner is projected laterally toward opening $1^b$ until the shoulder 17 of lug $3^a$ contacts with the shoulder 18 of the T body 1. Then will the outside end of the liner 3 and the face of the flange 8 be flush. Liner 5 is thereupon inserted in the same manner and to the same extent as liner 3 and projected to the right toward opening $1^a$ until the shoulder 19 of the lug $5^a$ contacts with the shoulder 20 of the body of the T 1. Then will the outside end of liner 5 be flush with the face of flange 9. Liner 4 may then be inserted between 3 and 5.

What I claim is:—

1. In a T connection for material conveying conduits the combination of a T body provided with a branch opening removable cover for the branch opening, an opening in the side of the T body, a plurality of removable segmental wear sections arranged within the T body and adapted to be removed through said opening, said wear sections being provided with laterally projecting lugs on one side thereof, two of said wear sections being adapted for insertion through said side opening and subsequent longitudinal projection to the main openings of the T interior, and a cover plate sealing said lateral opening and adapted to engage said wear section lugs to retain the wear sections against lateral movement.

2. In a T connection for material conveying conduits the combination of a T body provided with a branch opening removable cover for the branch opening, an opening in the side of the T body, a removable segmental wear section arranged within the T body and provided with laterally projecting lugs, and a cover plate sealing said lateral opening and adapted to engage the wear section lugs to retain same against lateral movement.

3. In a T connection for material conveying conduits the combination of a T body provided with a branch opening removable cover for the branch opening, an opening formed in the side of the T body, an enlargement of the T body formed in the lower portion thereof, a plurality of removable wear sections arranged within the T body and carried by said enlargement, two of said wear sections being provided with lugs for limiting the longitudinal movement thereof within the T body, a cover plate for sealing said lateral opening, and means for securing the cover plate in position.

4. In a T connection for material conveying conduits the combination of a T body provided with a branch opening removable cover for the branch opening, an enlargement of the T body formed in the lower portion thereof and eccentric with the upper bore portion thereof, a removable segmental wear section arranged within said enlargement and within the T body and provided with laterally projecting lugs, an opening in the side of the T body adapted for the removal of said wear section, a cover plate for sealing said opening and engaging the lugs on said wear section to retain same against lateral movement, and means for securing the cover plate in position.

LORNE A. GRIFFIN.

Witnesses:
 ALETHA F. WIDER,
 CHARLES A. AITKEN.